United States Patent
Sato et al.

(10) Patent No.: US 12,303,860 B2
(45) Date of Patent: *May 20, 2025

(54) OXYGEN SCAVENGER COMPOSITION AND PRODUCTION METHOD FOR SAME

(71) Applicant: MITSUBISHI GAS CHEMICAL COMPANY, INC., Tokyo (JP)

(72) Inventors: Daiki Sato, Tokyo (JP); Atsushi Inoue, Tokyo (JP)

(73) Assignee: MITSUBISHI GAS CHEMICAL COMPANY, INC., Tokyo (JP)

( * ) Notice: Subject to any disclaimer, the term of this patent is extended or adjusted under 35 U.S.C. 154(b) by 710 days.

This patent is subject to a terminal disclaimer.

(21) Appl. No.: 17/609,921

(22) PCT Filed: May 19, 2020

(86) PCT No.: PCT/JP2020/019772
§ 371 (c)(1),
(2) Date: Nov. 9, 2021

(87) PCT Pub. No.: WO2020/241378
PCT Pub. Date: Dec. 3, 2020

(65) Prior Publication Data
US 2022/0226799 A1 Jul. 21, 2022

(30) Foreign Application Priority Data
May 24, 2019 (JP) ................. 2019-097960

(51) Int. Cl.
*B01J 20/02* (2006.01)
*B01D 53/02* (2006.01)
*B01J 20/04* (2006.01)
*B01J 20/12* (2006.01)
*B01J 20/14* (2006.01)
*B01J 20/20* (2006.01)
*B01J 20/24* (2006.01)
*B01J 20/28* (2006.01)
*B65D 81/26* (2006.01)

(52) U.S. Cl.
CPC .......... *B01J 20/0229* (2013.01); *B01D 53/02* (2013.01); *B01J 20/046* (2013.01); *B01J 20/12* (2013.01); *B01J 20/14* (2013.01); *B01J 20/20* (2013.01); *B01J 20/24* (2013.01); *B01J 20/28004* (2013.01); *B01J 20/2803* (2013.01); *B01J 20/2805* (2013.01); *B65D 81/268* (2013.01); *B01D 2253/102* (2013.01); *B01D 2253/11* (2013.01); *B01D 2253/1122* (2013.01); *B01D 2253/20* (2013.01); *B01D 2253/25* (2013.01); *B01D 2253/304* (2013.01); *B01D 2257/104* (2013.01)

(58) Field of Classification Search
None
See application file for complete search history.

(56) References Cited

U.S. PATENT DOCUMENTS

| | | | |
|---|---|---|---|
| 4,366,179 A | 12/1982 | Nawata et al. | |
| 5,725,795 A * | 3/1998 | Kashiba | A23L 3/3436 252/194 |
| 2009/0159846 A1 | 6/2009 | Sugimoto et al. | |
| 2011/0172091 A1 | 7/2011 | Sugimoto et al. | |
| 2019/0083955 A1 | 3/2019 | Sugimoto et al. | |

FOREIGN PATENT DOCUMENTS

| | | |
|---|---|---|
| CN | 1337273 | 2/2002 |
| CN | 105433188 A | 3/2016 |
| CN | 108271991 | 7/2018 |
| JP | 56-133027 A | 10/1981 |
| JP | 9-271661 A | 10/1997 |
| JP | 2007-144407 A | 6/2007 |
| JP | 2007-144408 A | 6/2007 |
| JP | 2008-264665 A | 11/2008 |
| JP | 2011-10573 A | 1/2011 |
| JP | 2017225953 A * | 12/2017 |
| WO | 2007/046449 A1 | 4/2007 |
| WO | 2017/169015 A1 | 10/2017 |

OTHER PUBLICATIONS

English translation of CN105433188 (Year: 2016).*
International Search Report issued in International Patent Application No. PCT/JP2020/019772, dated Jul. 28, 2020, along with an English translation thereof.
Written Opinion of the International Searching Authority issued in International Patent Application No. PCT/JP2020/019772, dated Jul. 28, 2020, along with an English translation thereof.

* cited by examiner

*Primary Examiner* — Tanisha Diggs
(74) *Attorney, Agent, or Firm* — GREENBLUM & BERNSTEIN P.L.C.

(57) ABSTRACT

An oxygen scavenger composition including a mixed granule that includes a water retention agent, a swelling agent, a metal salt, water, and iron, as well as a method for producing the oxygen scavenger composition, the method including: collectively mixing a water retention agent, a swelling agent, a metal salt, water, and iron for granulation.

5 Claims, No Drawings

OXYGEN SCAVENGER COMPOSITION AND PRODUCTION METHOD FOR SAME

TECHNICAL FIELD

The present invention relates to an oxygen scavenger composition and a method for producing the same, and particularly relates to an iron-based oxygen scavenger composition and a method for producing the same.

BACKGROUND ART

A method of using an oxygen scavenger is known as a storage technique for food products, pharmaceutical products, and the like. In this method, an article to be stored and the oxygen scavenger are enclosed and sealed in a sealed container having a gas-barrier properties, thereby allowing the oxygen scavenger to absorb oxygen in the sealed container. Thus, an atmosphere in the sealed container can be kept substantially in an oxygen-free state. As a required function, the oxygen scavenger must be small in size and can absorb oxygen in large quantities. In other words, an oxygen scavenger composition with a large amount of oxygen absorption per unit volume is required.

Exemplary oxygen scavengers include: iron-based oxygen scavengers that include iron (iron powder) as their main agent; and non-iron-based oxygen scavengers that include ascorbic acid, glycerin, and the like as their main agents. The oxygen scavenger is appropriately selected according to the intended use, but an iron-based oxygen scavenger is widely used from the viewpoint of oxygen absorption performance.

An iron powder requires moisture to absorb oxygen. In known oxygen scavengers including an iron powder and water, the iron powder and a water retention agent retaining water for supplying moisture are included as different powdery/granular materials that can be separated from each other. As a result, gaps may be created between the powdery/granular material of the iron powder and the powdery/granular material of the water retention agent, and such gaps may contribute to reduction in an amount of oxygen absorption per unit volume of the oxygen scavenger composition. Furthermore, the iron powder and the water retention agent are aggregated and bonded readily with the iron powder each other or the water retention agent each other, and easily formed into a mass. Formation of the mass of the iron powder reduces a surface area available for oxidation of the iron powder. As a result, there arises a problem of decrease in the amount of oxygen absorption as compared with a case where the iron powder and the water retention agent are uniformly dispersed and mixed together.

For example, Patent Document 1 discloses an oxygen scavenger composition that includes an oxygen absorbing substance, water, and a swelling agent, and is pressure-molded into a solid form to eliminate gaps between powdery/granular material, thereby achieving a reduced volume and a compact size. However, as compared with an oxygen scavenger composition that can be produced by simply mixing, the oxygen scavenger composition as described in Patent Document 1 additionally requires the pressure-molding step during production, which causes an increase in production cost. Furthermore, since the iron powder located deeper in an interior of the powdery/granular material is less likely to be oxidized, there is a room for improvement in amount of oxygen absorption per unit volume.

For the purpose of providing an oxygen scavenger composition which solves the problem with the oxygen scavenger composition of Patent Document 1 and has an excellent amount of oxygen absorption per unit volume, Patent Document 2 discloses an oxygen scavenger composition including a powdery/granular material that has: an α layer containing a water retention agent, a swelling agent, a metal salt, and water; a β layer containing iron; and a γ layer containing a porous carrier; wherein the powdery/granular material forms a layer structure in the order of the α, β, and γ layers from an inside to an outside of the powdery/granular material.

CITATION LIST

Patent Documents

Patent Document 1: WO 2007/046449
Patent Document 2: WO 2017/169015

SUMMARY OF INVENTION

Technical Problem

From the viewpoint of preventing an article to be stored within a sealed container from undergoing oxidation, there is a demand for an oxygen scavenger that absorbs oxygen in the sealed container in as short a time period as possible. In addition, for the oxygen scavenger of Patent Document 2, its production process needs to include: adding an aqueous solution of a metal halide salt while mixing a water retention agent and a swelling agent to prepare a powdery/granular material which is a raw material of an α layer; and then adding an iron powder to the powdery/granular material to deposit the iron powder onto an outside of the α layer to prepare an (α layer/β layer) powdery/granular material. Thus, there is a need for a method for producing an oxygen scavenger more efficiently.

Accordingly, a problem to be solved by the present invention is to provide an oxygen scavenger composition having a high oxygen absorption rate at an initial stage of an oxidation reaction of iron. Another problem to be solved by the present invention is to provide a method for efficiently producing an oxygen scavenger composition having a high oxygen absorption rate at an initial stage of an oxidation reaction of iron.

Solution to Problem

The present invention relates to an oxygen scavenger composition and a method for producing the same which will be described below.

<1> An oxygen scavenger composition including a mixed granule of a composition that includes a water retention agent, a swelling agent, a metal salt, water, and iron.

<2> The oxygen scavenger composition according to <1>, which has an average particle size of 0.3 mm or more and 5.0 mm or less.

<3> The oxygen scavenger composition according to <1> or <2>, which has a layer containing a porous carrier on an outside of the mixed granule.

<4> The oxygen scavenger composition according to any one of <1> to <3>, wherein the water retention agent contains at least one type selected from the group consisting of diatomaceous earth, silica, and activated carbon.

<5> The oxygen scavenger composition according to any one of <1> to <4>, wherein the swelling agent contains at least one type selected from the group consisting of carboxymethylcellulose calcium, carboxymethylcellulose sodium, calcium bentonite, and sodium bentonite.

<6> The oxygen scavenger composition according to any one of <1> to <5>, wherein the mixed granule is not a pressure-molded product.

<7> The oxygen scavenger composition according to any one of <1> to <6>, wherein iron is dispersed throughout the entire mixed granule.

<8> A method for producing the oxygen scavenger composition according to any one of <1> to <7>, the method including collectively mixing a water retention agent, a swelling agent, a metal salt, water and iron for granulation.

<9> An oxygen scavenger package including the oxygen scavenger composition according to any one of <1> to <7> and an air-permeable packaging material in which the oxygen scavenger composition is contained.

Advantageous Effects of Invention

The oxygen scavenger composition of the present invention has a high oxygen absorption rate at an initial stage of an oxidation reaction of iron, and is capable of absorbing oxygen in a sealed container in a short time period. In addition, the production method of the present invention enables efficient production of an oxygen scavenger composition that has a high oxygen absorption rate at an initial stage of an oxidation reaction of iron, and absorbs oxygen in a sealed container in a short time period.

DESCRIPTION OF EMBODIMENTS

An embodiment according to the present invention will be described below. The content of the present invention is not limited to the embodiment described below.

Note that in the present specification, a phrase of "A to B" indicating a numerical range means "more than or equal to A and less than or equal to B" (in the case of A<B), or "less than or equal to A and more than or equal to B" (in the case of A>B). Furthermore, in the present invention, a combination of preferable aspects is a more preferable aspect.

[Oxygen Scavenger Composition]

The oxygen scavenger composition of the present invention includes a mixed granule of a composition that includes a water retention agent, a swelling agent, a metal salt, water, and iron. The mixed granule of the present invention preferably has iron dispersed throughout the entire mixed granule. The oxygen scavenger composition of the present invention may consist only of the mixed granule or may have a layer containing a porous carrier on an outside of the mixed granule.

The present inventors found that an oxygen scavenger composition including a mixed granule of a composition that includes a water retention agent, a swelling agent, a metal salt, water, and iron, the mixed granule being obtainable by collectively mixing a water retention agent, a swelling agent, a metal salt, water, and iron for granulation, has a high oxygen absorption rate at an initial stage of an oxidation reaction of iron and can absorb oxygen in a sealed container in a short time period.

In Patent Document 2, after addition of an aqueous solution of a metal halide salt while mixing a water retention agent and a swelling agent to prepare a powdery/granular material that is a raw material of an α layer, an iron powder is added to the powdery/granular material to deposit the iron powder onto an outside of the α layer, thereby preparing an (α layer/β layer) powdery/granular material, and, further, hydrophobic silica is further added to the (α layer/β layer) powdery/granular material to deposit the hydrophobic silica onto an outside of the β layer, thereby preparing an (α layer/β layer/γ layer) powdery/granular material. While the oxygen scavenger composition described in Patent Document 2 has a practically sufficient oxygen absorption rate at an initial reaction stage, the oxygen scavenger composition of the present invention has a further high oxygen absorption rate at an initial reaction stage and can absorb oxygen in a sealed container in a short time period.

A detailed mechanism that leads to effects of an embodiment of the present invention is unclear, but it is inferred as follows: a water retention agent, a swelling agent, a metal salt, water, and iron are collectively mixed for granulation so that iron is dispersed throughout the entire granule and iron and water are present in close proximity; thus that an amount involved in the reaction at an initial stage of an oxidation reaction of iron is large, resulting in a high oxygen absorption rate at the initial stage of the reaction; and that oxygen in the sealed container can be absorbed in a short time period.

(Water Retention Agent)

The water retention agent included in the oxygen scavenger composition of the present invention is a substance that is impregnated with water in its interior and can retain water without seeping out water.

The water retention agent is not particularly limited as long as it can retain water, and generally available porous materials and highly water absorbing resins can be used. Examples of porous materials include diatomaceous earth, zeolite, sepiolite, cristobalite, porous glass, silica, activated clay, acid clay, activated carbon, vermiculite and wood flour. Examples of highly water absorbing resins include polyacrylate salt-based resins, polysulfonate salt-based resins, polyacrylamide-based resins, polyvinyl alcohol-based resins, starch-based resins, cellulose-based resins, and polyalginate-based resins. The water retention agent preferably contains at least one type selected from the group consisting of diatomaceous earth, silica, and activated carbon. The water retention agents described above can be used alone, or two or more types thereof can be used in combination as necessary. Furthermore, as these water retention agents, commercially available products can also be easily obtained.

Among the water retention agents described above, activated carbon is particularly preferable because it has a function of promoting an oxidation reaction of iron in addition to the water retaining function. The type of activated carbon is not particularly limited, and may be any of wood-based, coconut shell, coal, and the like.

A property and a form of the water retention agent are not particularly limited, but a powder having a high fluidity is suitably used from the viewpoint of ease of handling during production of the oxygen scavenger, and its shape is more preferably close to spherical shape. Furthermore, the water retention agent has an average particle size of preferably 10 μm or more and 1000 μm or less, and more preferably 100 μm or more and 500 μm or less from the viewpoint of ease of handling during production of the oxygen scavenger. Any particles of the water retention agent can be used regardless of whether they are primary particles, agglomerated particles or granules, as long as the particles have a particle size in the range specified above. The water retention agents having a particle size in the range specified above can be used alone, or a plurality of types thereof having different particle sizes can be mixed at any ratio.

A content of the water retention agent in the oxygen scavenger composition is not particularly limited, but is preferably 10 mass % or more and 40 mass % or less, and more preferably 15 mass % or more and 30 mass % or less in 100 mass % of the oxygen scavenger composition. In addition, the content of the water retention agent is preferably 20 parts or more by mass and 300 parts or less by mass, and more preferably 50 parts or more by mass and 200 parts or less by mass per 100 parts or more by mass of water. When the content of the water retention agent is within the range specified above, the oxygen scavenger composition can sufficiently retain water, and the amount of oxygen absorption per unit volume of the oxygen scavenger composition can be increased.

(Swelling Agent)

The swelling agent included in the oxygen scavenger composition of the present invention is a substance that undergoes swelling by moisture and has a binding function to retain the shape of the granule. The swelling agent is preferably used in a substantially dry state or a semi-swollen or swollen state, in which the swelling agent has absorbed water in an amount from a small amount to a required amount.

The swelling agent is not particularly limited as long as it is a commonly known swelling agent, and known swelling agents used in foods and the like, binding agents, adhesives, and binders can be used.

Examples of inorganic swelling agents include clay minerals such as sodium bentonite, calcium bentonite, and sodium montmorillonite. Examples of organic swelling agents include organic bentonite; natural products such as fat-free frozen bean curd, agar, starch, dextrin, gum arabic, gelatin, and casein; semi-synthetic products such as crystalline cellulose, carboxymethyl cellulose, carboxymethylcellulose sodium, carboxymethylcellulose calcium, hydroxyethyl cellulose, lignosulfonates, and hydroxyethyl starch; and synthetic products such as water insolubilized polyvinyl alcohol and polyvinyl methyl ether. The swelling agents described above can be used alone, or two or more types thereof can be used in combination as necessary. Furthermore, as these swelling agents, commercially available products can also be easily obtained.

Clay minerals are preferable because they are inexpensive and have excellent performance Clay minerals are also known as inorganic soaps and have function as lubricants. In addition, a clay mineral, which has swollen with water, is preferable because it is known to exhibit a high thixotropy and it also exhibits binding properties. In addition, the semi-synthetic cellulose product exhibits excellent swelling properties and is preferable. Among these, bentonite such as calcium bentonite and sodium bentonite, and carboxymethyl cellulose, carboxymethylcellulose sodium, carboxymethylcellulose calcium, and the like are preferable because of their low cost and strong binding power. The swelling agent preferably contains at least one type selected from the group consisting of carboxymethylcellulose calcium, carboxymethylcellulose sodium, calcium bentonite and sodium bentonite.

The swelling agent has an average particle size of preferably 0.001 μm or more and 10 μm or less, and more preferably 0.01 μm or more and 1.0 μm or less from the viewpoint of suppressing generation of dust and the binding function.

A content of the swelling agent in the oxygen scavenger composition is not particularly limited, but is preferably 0.1 mass % or more and 20 mass % or less, and more preferably 1 mass % or more and 15 mass % or less in 100 mass % of the oxygen scavenger composition. Furthermore, the content is preferably 1 part or more by mass and 15 parts or less by mass, and more preferably 3 parts or more by mass and 10 parts or less by mass per 100 parts by mass of the iron. When the content of the swelling agent is within the range specified above, the oxygen scavenger composition can easily retain its shape. Additionally, a proportion of the water retention agent is not too small, an amount of moisture to be supplied to the iron will not decrease, and an amount of oxygen absorption tends to be higher.

(Metal Salt)

The metal salt included in the oxygen scavenger composition of the present invention is a substance that catalytically acts on the oxidation reaction of the iron to improve the iron activity. The metal salt also serves to prevent vaporization of the water included in the oxygen scavenger composition and loss of the water from the oxygen scavenger composition.

The metal salt is not particularly limited, but a metal halide is preferable. Any commonly known metal halide can be used as the metal halide without particular limitation.

The metal in the metal halide is not particularly limited, and examples thereof include at least one type selected from the group consisting of alkali metals, alkaline earth metals, copper, zinc, aluminum, tin, iron, cobalt, and nickel. Among these, at least one type selected from the group consisting of lithium, potassium, sodium, magnesium, calcium, barium, and iron is more preferable. The halide in the metal halide is not particularly limited, and examples thereof include chloride, bromide, and iodide.

From the viewpoints of ease of handling, safety, and the like, calcium chloride, sodium chloride, calcium bromide, sodium bromide, calcium iodide, and sodium iodide are preferable, and calcium chloride and sodium chloride are more preferable, as the metal halide.

The metal salts can be used alone, or two or more types thereof can be used in combination as necessary. As these metal salts, commercially available products can also be easily obtained.

When an aqueous solution of the metal salt is used as a raw material, a salt concentration is preferably 5 mass % or more and 30 mass % or less, and more preferably 10 mass % or more and 20 mass % or less. When the salt concentration is 5 mass % or more, it is possible to suppress reduction of catalyzing action for iron oxidation. Additionally, when the salt concentration is 30 mass % or less, it is possible to suppress reduction in vapor pressure of moisture. It is possible to suppress reduction in an amount of oxygen absorption due to insufficient supply of moisture to the iron.

A content of the metal salt in the oxygen scavenger composition is not particularly limited, but is preferably 0.5 mass % or more and 15 mass % or less, and more preferably 1 mass % or more and 10 mass % or less in 100 mass % of the oxygen scavenger composition. In addition, the content of the metal salt is preferably 0.5 parts or more by mass and 20 parts or less by mass, and more preferably 2 parts or more by mass and 10 parts or less by mass per 100 parts by mass of the iron.

(Water)

From the viewpoint of the oxygen absorption performance of the iron-based oxygen scavenger, the oxygen scavenger composition of the present invention includes water. A content of the water in the oxygen scavenger composition is not particularly limited, but is preferably 10 mass % or more and 40 mass % or less, and more preferably 15 mass % or more and 30 mass % or less in 100 mass % of the oxygen scavenger composition. Furthermore, from the viewpoint of the oxygen absorption performance, the content of the water is preferably 20 parts or more by mass and 50 parts or less by mass, and more preferably 25 parts or more by mass and 40 parts or less by mass, per 100 parts by mass of the iron.

(Iron)

A form of the iron included in the oxygen scavenger composition of the present invention is not particularly limited, but is preferably in a form of an iron powder, from the viewpoint of the oxygen absorption performance, availability, and ease of handling. The iron powder is not particularly limited as long as the iron surface is exposed, and a reduced iron powder, an electrolytic iron powder, an atomized iron powder, or the like can be suitably used. Furthermore, a pulverized product or a cutting chip of cast iron or the like can also be used.

The iron powders can be used alone, or two or more types thereof can be used in combination as necessary. Furthermore, as these iron powders, commercially available products can also be easily obtained.

An iron powder having a surface coated with a metal halide can also be used. The metal halide-coated iron powder can be prepared by mixing an iron powder and an aqueous solution of a metal halide, and then drying the mixture to remove moisture. The metal halide coated on the iron powder may be coated with the metal salt described above.

The iron powder has an average particle size of preferably 1 mm or less, more preferably 500 µm or less, and even more preferably 200 µm or less from the viewpoint of improving contact with oxygen, and preferably 1 µm or more, more preferably 10 µm or more, and even more preferably 20 µm or more from the viewpoint of suppressing generation of dust. The particle size referred to herein refers to a particle size determined by the weight fractions in accordance with the mesh sizes of standard sieves after subjecting the particles to vibration for 5 minutes using the standard sieves conforming to ISO 3310-1:2000 (corresponding to JIS Z8801-1:2006).

Furthermore, from the viewpoint of the oxygen absorption capacity, a specific surface area of the iron powder is preferably 0.05 $m^2/g$ or more and more preferably 0.1 $m^2/g$ or more. The specific surface area of the iron powder can be determined by the BET multipoint method.

The oxygen scavenger composition of the present invention includes iron as its main agent. A content of the iron in the oxygen scavenger composition is preferably 40 mass % or more and 90 mass % or less, more preferably 45 mass % or more and 80 mass % or less, further preferably 50 mass % or more and 70 mass % or less, and even more preferably 50 mass % or more and 60 mass % or less, of the oxygen scavenger composition.

<Mixed Granule>

The oxygen scavenger composition of the present invention includes a mixed granule of a composition that includes a water retention agent, a swelling agent, a metal salt, water, and iron. Here, in the present invention, "granulation" refers to an operation of processing raw material powders including a single or multiple component, by mixing the raw material powders using a binding agent or the like, into larger particles than the raw material powder, while reducing a presence ratio of fine powder as compared with the state of the raw material powder. "Granule" refers to a powdery/granular material obtained by the granulating operation. The granule is processed into a larger particle than the raw material powder, with a reduced presence ratio of fine powder as compared with that in a state of the raw material powder. The mixed granule of the present invention is not a pressure-molded product. That is, the granule included in the oxygen scavenger composition of the present invention can be conveniently produced at a low cost by simply mixing without performing pressure molding.

Additionally, in the mixed granule of the present invention, iron is preferably dispersed throughout the entire mixed granule. In Patent Document 2, the iron powder is localized near the outside of the powdery/granular material, since the powdery/granular material that is a raw material of the α layer is prepared by adding an aqueous solution of a metal halide salt while mixing a water retention agent and a swelling agent, and then adding an iron powder to the powdery/granular material to deposit the iron powder onto the outside of the α layer to prepare an (α layer/(β layer) powdery/granular material. In contrast, the method for producing the oxygen scavenger composition of the present invention, as described below, includes a step of collectively mixing a water retention agent, a swelling agent, a metal salt, water, and iron for granulation. In the granule obtained by the method, the iron is dispersed throughout the entire granule.

A content of the mixed granule in the oxygen scavenger composition of the present invention is preferably 90 mass % or more, more preferably 95 mass % or more, even more preferably 98 mass % or more, and even more preferably substantially 100 mass %.

(Porous Carrier)

The oxygen scavenger composition of the present invention may consist only of the mixed granule or may have a layer containing a porous carrier on an outside of the mixed granule.

The porous carrier that can be used in an embodiment of the present invention is not particularly limited as long as it has a form of porous state. Here, "porous" refers to a state of a material where the material contains a large number of pores observable by an electron microscope, on its surface and interior. The porous carrier can be a porous material used in the water retention agent described above as appropriate, but is preferably silica. Silica refers to a material that includes silicon dioxide ($SiO_2$) as its main component. The use of the silica increases a bulk density of the obtained powdery/granular material, and the amount of oxygen absorption.

The silica is not particularly limited, and examples thereof include hydrophobic silica (surface-treated silica), wet silica, dry silica, silica gel, diatomaceous earth, acid clay, activated clay, pearlite, kaolin, talc, and bentonite. The porous carriers described above can be used alone, or two or more types thereof can be used in combination as necessary. As these porous carriers, commercially available products can also be easily obtained.

When the oxygen scavenger composition of the present invention has a layer containing a porous carrier, a content of the porous carrier in the layer containing the porous carrier is preferably 30 mass % or more, more preferably 50 mass % or more, and even more preferably 80 mass % or more.

When the oxygen scavenger composition of the present invention has a layer containing a porous carrier, a content of the porous carrier in the oxygen scavenger composition is preferably 0.1 mass % or more and 5 mass % or less, and more preferably 0.5 mass % or more and 3 mass % or less. When the content of the porous carrier is within this range, a bulk density of the oxygen scavenger composition increases, and the amount of oxygen absorption readily increases. Additionally, fluidity of the oxygen scavenger composition improves, thereby improving the ease of handling of the oxygen scavenger package during manufacture.

<Shape of Oxygen Scavenger Composition>

A shape of the oxygen scavenger composition of the present invention is not particularly limited, and examples include spherical, elliptical, and cylindrical. The spherical shape is preferable from the viewpoint of its tendency to improve filling properties and to increase the bulk density.

The oxygen scavenger composition of the present invention has an average particle size of preferably 0.3 mm or more and 5.0 mm or less, and more preferably 0.5 mm or more and 2.0 mm or less. When the average particle size is 0.3 mm or more, the oxygen scavenger composition is less likely to be deposited onto a powdery/granular material contact portion of a packaging machine due to static electricity or the like during filling and packaging. When the average particle size is 5.0 mm or less, the gap between the powdery/granular materials is less likely to become too large, thereby suppressing the reduction in amount of oxygen absorption per unit volume. The oxygen scavenger composition having an average particle size within the range specified above can be obtained, for example, through sieving using, for example, a sieve having openings of 0.3 mm and 2 mm. The average particle size can be measured by, for example, a commercially available laser diffraction/scattering type particle size distribution measuring device ("LA-960", available from Horiba, Ltd.).

The bulk density of the oxygen scavenger composition of the present invention is not particularly limited, but is preferably 1.0 g/mL or more, more preferably 1.3 g/mL or more, and even more preferably 1.5 g/mL or more. When the bulk density is 1.0 g/mL or more, the amount of oxygen absorption per unit volume tends to be superior. An oxygen scavenger composition having a bulk density within the range specified above can be obtained, for example, by separating out those having a target bulk density using, for example, a specific gravity classifier (such as "High Speed Aspirator", available from Tokyo Seifunki Mfg. Co., Ltd.). The bulk density can be measured in accordance with JIS Z8901.

[Method for Producing Oxygen Scavenger Composition]

The method for producing the oxygen scavenger composition of the present invention is not particularly limited, but is preferably a method including a step of collectively mixing a water retention agent, a swelling agent, a metal salt, water, and iron for granulation (production method of the present invention). In the production method of the present invention, a mixed granule can be prepared by mixing a water retention agent, a swelling agent, a metal salt, water, and iron until they are uniformly dispersed, and an oxygen scavenger composition can be prepared efficiently. In Patent Document 2, after addition of an aqueous solution of a metal halide salt while mixing a water retention agent and a swelling agent to prepare a powdery/granular material that is a raw material of an α layer, an iron powder is added to the powdery/granular material to deposit the iron powder onto an outside of the α layer, thereby preparing an (α layer/β layer) powdery/granular material, and, further, hydrophobic silica is further added to the (α layer/β layer) powdery/granular material to deposit the hydrophobic silica onto an outside of the β layer, thereby preparing an (α layer/β layer/γ layer) powdery/granular material. In other words, the composition disclosed in Patent Document 2 requires a two-stage step including preparing a powdery/granular material that is a raw material of the α layer, and then depositing the iron powder to the outside of the α layer. In contrast, the production method of the present invention enables production of an oxygen scavenger composition through a single-stage step of collectively mixing a water retention agent, a swelling agent, a metal salt, water, and iron for granulation. Therefore, it is possible to produce an oxygen scavenger composition more efficiently than the method of Patent Document 2. Further, the mixed granule included in the oxygen scavenger composition of the present invention can be conveniently produced at a low cost by simply mixing without performing pressure molding.

The mixing device is not particularly limited, and, as specific examples, a Nauta mixer (available from Hosokawa Micron Corporation), a conical mixer (available from Ono Kagaku Kikai K. K.), a vertical granulator (available from Powrex corp.), a high speed mixer (available from EARTH-TECHNICA Co., Ltd.), and a granulator (available from AKIRAKIKO Co., Ltd.) can be used.

Additionally, as a method for producing an oxygen scavenger composition having a layer containing a porous carrier, an oxygen scavenger composition can be prepared by adding surface-treated silica (hydrophobic silica) to the mixed granule and mixing them to form a layer containing a porous carrier on the outside of the mixed granule.

Since iron, which is a main agent of an oxygen scavenger, reacts with oxygen, the reaction with oxygen progresses gradually even in the absence of water, a metal salt, or the like. Therefore, it is preferable to perform the mixing in an inert atmosphere (in a case where a substantially sealed system is used, the system is normally under a reductive atmosphere without oxygen), and to take a heat removal means as appropriate.

[Oxygen Scavenger Package]

The oxygen scavenger package of the present invention includes the oxygen scavenger composition described above and an air-permeable packaging material in which the oxygen scavenger composition is housed.

(Packaging Material)

Examples of the packaging material include: a packaging material having a bag shape formed by bonding two sheets of an air-permeable packaging material to each other; a packaging material having a bag shape formed by bonding one sheet of an air-permeable packaging material and one sheet of a non-air-permeable packaging material to each other; and a packaging material having a bag shape formed by folding one sheet of an air-permeable packaging material and sealing edges except the folded portion.

Here, when the air-permeable packaging material and the non-air-permeable packaging material each have a quadrilateral shape, examples of the packaging material include: a packaging material having a bag shape formed by overlapping two sheets of an air-permeable packaging material and heat-sealing their four sides; a packaging material having a bag shape formed by overlapping one sheet of an air-permeable packaging material and one sheet of a non-air-permeable packaging material and heat-sealing their four sides; and a packaging material having a bag shape formed by folding one sheet of an air-permeable packaging material and heat-sealing its three sides except the folded portion. Furthermore, the packaging material may be a packaging material having a bag shape formed by forming an air-permeable packaging material into a tubular shape and heat-sealing both ends and the trunk portion of the resulting tubular body.

(Air-Permeable Packaging Material)

As the air-permeable packaging material, a packaging material through which oxygen and carbon dioxide permeates is selected. Of these, a packaging material having an air permeability resistance of 600 seconds or less, more preferably 90 seconds or less by a Gurley tester method is suitably used. Here, the air permeability resistance refers to a value measured by a method in accordance with JIS P 8117 (1998). More specifically, it refers to a time period required for 100 mL of air to permeate through an air-permeable packaging material using a Gurley densometer available from Toyo Seiki Seisaku-sho, Ltd.

As the air-permeable packaging material, in addition to paper and nonwoven fabric, a plastic film, to which air permeability is imparted, is used. Examples of such a plastic film include a laminate film obtained by laminating and bonding a film of polyethylene terephthalate, polyamide, polypropylene, polycarbonate, or the like, and a film of polyethylene, an ionomer, polybutadiene, ethylene acrylic acid copolymer, ethylene methacrylate copolymer, ethylene vinyl acetate copolymer, or the like as a sealing layer. These laminates can also be used as the air-permeable packaging material.

As the method of imparting air permeability, various methods can be employed, in addition to punching with a cold needle or a heat needle. When air permeability is imparted by punching, the air permeability can be freely adjusted by a diameter, the number, a material, and the like of holes to be punched.

The thickness of the laminated film is preferably from 50 to 300 µm, and particularly preferably from 60 to 250 µm. In this case, as compared to a case where the thickness deviates from the range described above, the packaging material can be a packaging material that retains strength and has an excellent heat sealing property and packaging suitability.

EXAMPLES

Hereinafter, the present embodiment will be described in detail using Examples and Comparative Examples, but the present embodiment can be modified as appropriate as long as the present embodiment achieves the effects of the present invention. Note that "parts" in Examples and Comparative Examples refer to parts by mass when not specifically stated.
(Average Particle Size of Oxygen Scavenger Composition)

The average particle size of the oxygen scavenger composition was measured by a laser diffraction/scattering type particle size distribution measuring device ("LA-960", available from Horiba, Ltd.).
(Bulk Density of Oxygen Scavenger Composition)

The bulk density (unit: g/mL) of the oxygen scavenger composition was measured in accordance with JIS Z8901.
(Amount of Oxygen Absorption of Oxygen Scavenger Composition)

One (1) g of the oxygen scavenger composition was placed, along with 3000 mL of air, in a gas barrier bag (dimensions: 250 mm×400 mm) made of a nylon/polyethylene laminate film, and the bag was sealed. The gas barrier bag was retained for 4 hours and 72 hours at 25° C., and the oxygen concentration in the gas barrier bag was measured to calculate the amount of oxygen absorption (unit: mL). The resulting amount of oxygen absorption was divided by the volume of the oxygen scavenger composition (unit: mL) to calculate the amount of oxygen absorption per unit volume (unit: mL/mL).

Example 1

To a high speed mixer ("SPG20L", available from EARTHTECHNICA Co., Ltd.), 1240 parts of diatomaceous earth ("CG-2U", available from Isolite Insulating Products Co., Ltd.), 1120 parts of activated carbon ("S-W50", available from Futamura Chemical Co., Ltd.), 225 parts of calcium bentonite ("Neokuni Bond", available from Kunimine Industries Co., Ltd.), 20 parts of carboxymethylcellulose sodium ("F350HC-4", available from Nippon Paper Chemicals Co., Ltd.), an aqueous sodium chloride solution, in which 407 parts of sodium chloride had been dissolved in 2008 parts of water, and 6000 parts of an iron powder (average particle size: 100 µm) were added, and mixed for 3 minutes at 240 rpm to obtain a mixed granule.

Furthermore, 110 parts of surface-treated silica ("SS-30P", available from Tosoh Silica Corporation) was added to the mixed granule, and they were mixed for 30 seconds at 240 rpm to obtain an oxygen scavenger composition in which a porous carrier layer was formed on an outside of the mixed granule. The average particle size of the resulting oxygen scavenger composition was 0.9 mm.

Example 2

In Example 1, the mixed granule was sampled before addition of the surface-treated silica, and used as an oxygen scavenger composition of Example 2.

Comparative Example 1

To a high speed mixer ("SPG20L", available from EARTHTECHNICA Co., Ltd.), 1240 parts of diatomaceous earth ("CG-2U", available from Isolite Insulating Products Co., Ltd.), 1120 parts of activated carbon ("S-W50", available from Futamura Chemical Co., Ltd.), 225 parts of calcium bentonite ("Neokuni Bond", available from Kunimine Industries Co., Ltd.), and 20 parts of carboxymethylcellulose sodium("F350HC-4", available from Nippon Paper Chemicals Co., Ltd.) were added, and mixed for 30 seconds at 240 rpm. Next, an aqueous sodium chloride solution, in which 407 parts of sodium chloride had been dissolved in 2008 parts of water, was added over 30 seconds while mixing at 240 rpm, and then they were mixed for another 60 seconds to obtain a powdery/granular material that was a raw material for an α layer.

Next, 6000 parts of an iron powder (average particle size 100 µm) were added to the powdery/granular material, and they were mixed for 3 minutes at 240 rpm to obtain a powdery/granular material (α layer/(β layer) in which a β layer was formed on an outside of the powdery/granular material as the raw material of the α layer.

Furthermore, 110 parts of surface-treated silica ("SS-30P", available from Tosoh Silica Co., Ltd.) was added to the powdery/granular material, and they were mixed for 30 seconds at 240 rpm to obtain an oxygen scavenger composition including a powdery/granular material (α layer/β layer/γ layer) in which a γ layer was formed on the outside of the powdery/granular material (α layer/β layer). The average particle size of the resulting oxygen scavenger composition was 0.9 mm.

When a cross-sectional image was taken using a digital microscope ("VHX-2000", available from Keyence Corporation) for a cross-section by cutting the resulting oxygen scavenger composition by a cutter, it was confirmed that the powdery/granular material (α-layer/β-layer/γ layer) had a structure having the α layer in the center, the β layer on the outside of the α layer, and the γ layer on the outside of the β layer.

Comparative Example 2

In Comparative Example 1, the powdery/granular material (α layer/β layer) was sampled before the addition of surface-treated silica and used as an oxygen scavenger composition of Comparative Example 2.

The bulk density and amount of oxygen absorption per unit volume of the resulting oxygen scavenger composition are shown in Table 1. In Table 1, "Raw material addition method" indicates a method of adding raw materials other than surface-treated silica, "collective mixing" indicates that the raw materials other than surface-treated silica were collectively mixed, and "α layer/β layer" indicates that the raw materials other than the surface-treated silica and the iron powder were mixed to form a powdery/granular material as a raw material of the α layer, and then the iron powder was added to form the β layer on the outside of the α layer.

TABLE 1

|  | Bulk density (g/mL) | Amount of oxygen absorption (mL/mL) After 4 hours | Amount of oxygen absorption (mL/mL) After 72 hours | Raw material addition method | Porous carrier layer |
|---|---|---|---|---|---|
| Example 1 | 1.53 | 128 | 221 | Collective mixing | Present |
| Comparative Example 1 | 1.52 | 62 | 231 | α layer/ β layer | Present |
| Example 2 | 1.19 | 100 | 172 | Collective mixing | None |
| Comparative Example 2 | 1.22 | 50 | 185 | α layer/ β layer | None |

From a comparison between Example 1 and Comparative Example 1 and a comparison between Example 2 and Comparative Example 2, it can be seen that the oxygen scavenger compositions of Examples 1 and 2 in which the raw materials were collectively mixed are remarkably larger in amount of oxygen absorption after 4 hours, and higher in oxygen absorption rate at an initial stage of the oxidation reaction of the iron powder, than the oxygen scavenger compositions of Comparative Examples 1 and 2 in which the β-layer was formed on the outside of the α layer. That is, it can be seen that the oxygen scavenger compositions of Examples 1 and 2 can absorb oxygen in a sealed container in a short time period as compared with the oxygen scavenger compositions of Comparative Examples 1 and 2.

Furthermore, from a comparison between Example 1 and Comparative Example 1 and a comparison between Example 2 and Comparative Example 2, it can be seen that an oxygen scavenger composition having almost equivalent bulk density and amount of oxygen absorption per unit volume after 72 hours can be efficiently produced in one stage, according to the methods of the Examples in which the raw materials other than surface-treated silica were collectively mixed, as compared with the production methods of the Comparative Examples requiring a two-stage step of forming the powdery/granular material as the raw material of the α layer, then adding the iron powder to form the β layer on the outside of the α layer.

The invention claimed is:

1. An oxygen scavenger composition comprising a mixed granule of a composition that comprises a water retention agent, a swelling agent, a metal salt, water, and iron,
   which has an average particle size of 0.3 mm or more and 5.0 mm or less,
   wherein the mixed granule is not a pressure-molded product, and
   wherein the iron is dispersed throughout the entire mixed granule, and
   wherein a content of the iron in the oxygen scavenger composition is 40 mass % or more and 90 mass % or less, of the oxygen scavenger composition, and
   wherein a content of the swelling agent in the oxygen scavenger composition is 1 part or more by mass and 15 parts or less by mass per 100 parts by mass of the iron, and
   wherein the swelling agent contains at least one type selected from the group consisting of carboxymethylcellulose calcium, carboxymethylcellulose sodium, calcium bentonite, and sodium bentonite.

2. The oxygen scavenger composition according to claim 1, which has a layer comprising a porous carrier on an outside of the mixed granule.

3. The oxygen scavenger composition according to claim 1, wherein the water retention agent contains at least one type selected from the group consisting of diatomaceous earth, silica, and activated carbon.

4. A method for producing the oxygen scavenger composition according to claim 1, the method comprising collectively mixing a water retention agent, a swelling agent, a metal salt, water and iron for granulation.

5. An oxygen scavenger package comprising the oxygen scavenger composition according to claim 1 and an air-permeable packaging material in which the oxygen scavenger composition is contained.

* * * * *